United States Patent
Sun et al.

(10) Patent No.: US 8,015,449 B2
(45) Date of Patent: Sep. 6, 2011

(54) COMPUTER, AND METHOD FOR ERROR-DETECTING AND BOOTING OF BIOS THEREOF

(75) Inventors: Pei-Hua Sun, Taipei (TW); Chung-Ta Chin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 252 days.

(21) Appl. No.: 12/257,347

(22) Filed: Oct. 23, 2008

(65) Prior Publication Data

US 2009/0172472 A1   Jul. 2, 2009

(30) Foreign Application Priority Data

Dec. 28, 2007   (TW) ................................. 96151038 A (51) Int. Cl.
*G06F 11/00* (2006.01)
(52) U.S. Cl. .............................................. 714/36; 713/2
(58) Field of Classification Search .................... 714/36; 713/2

See application file for complete search history.

(56) References Cited

U.S. PATENT DOCUMENTS

| 5,793,943 A | 8/1998 | Noll |
| 6,079,016 A * | 6/2000 | Park .................................. 713/2 |
| 6,892,323 B2 * | 5/2005 | Lin .................................. 714/36 |
| 7,024,550 B2 * | 4/2006 | Collins et al. ...................... 713/2 |
| 2006/0236150 A1* | 10/2006 | Lintz et al. ......................... 714/6 |
| 2009/0271660 A1* | 10/2009 | Chin et al. ........................ 714/15 |

FOREIGN PATENT DOCUMENTS

| CN | 1504861 | 6/2004 |
| CN | 1707442 | 12/2005 |

\* cited by examiner

*Primary Examiner* — Marc Duncan
(74) *Attorney, Agent, or Firm* — Jianq Chyun IP Office (57) ABSTRACT

A computer has a first BIOS unit, a second BIOS unit, a bus, a detecting unit, and a first delay unit. The detecting unit is connected to the bus, the first BIOS unit, and the second BIOS unit operationally. In addition, the first delay unit is electrically connected to the detecting unit for controlling the detecting unit to check a status of a bus signal on the bus after a predetermined delay time. Accordingly, the detecting unit may enable the first BIOS unit or the second BIOS unit to boot the computer system according to the state of the bus signal.

7 Claims, 8 Drawing Sheets

COMPUTER, AND METHOD FOR ERROR-DETECTING AND BOOTING OF BIOS THEREOF

CROSS-REFERENCE TO RELATED APPLICATION

This application claims the priority benefit of Taiwan application serial no. 96151038, filed on Dec. 28, 2007. The entirety of the above-mentioned patent application is hereby incorporated by reference herein and made a part of this specification.

BACKGROUND OF THE INVENTION

1. Field of the Invention

The present invention relates to a computer system. More particularly, the present invention relates to a computer system having a plurality of basic input output systems and a booting method thereof.

2. Description of Related Art

The basic input output system (BIOS) is basic software program codes for being loaded to the computer hardware system, that is generally stored in a non-volatile memory, for example, a flash memory. Generally, main functions of the BIOS include power-on self test (POST), initialization, recording system settings, providing a permanent program library and loading an operation system.

With development of semiconductor fabrication process, peripheral hardware of the computer system is increasingly updated. To identify the updated peripheral hardware, software of the BIOS is also required to be simultaneously updated. During an actual updating process, the BIOS is liable to be damaged. For example, during updating of the BIOS, once there is a sudden power off, the whole content of the BIOS is damaged, so that the computer system cannot be smoothly booted.

SUMMARY OF THE INVENTION

Accordingly, the present invention is directed to a BIOS and an error-detecting circuit thereof, which may effectively recover the BIOS when it is damaged.

The present invention is directed to an error-detecting method for a BIOS and a booting method of a computer system, which may effectively detect an error of the BIOS, and may recover the BIOS when the error is occurred.

The present invention provides a computer system having a first BIOS unit, a second BIOS unit, a bus, a detecting unit, and a first delay unit. The detecting unit is operationally connected to the bus, the first BIOS unit, and the second BIOS unit for detecting a bus signal of the bus. In addition, the first delay unit is electrically connected to the detecting unit for controlling the detecting unit to check a state of the bus signal after a predetermined delay time. Accordingly, the detecting unit may enable the first BIOS unit or the second BIOS unit to boot the computer system according to the state of the bus signal.

In an embodiment of the present invention, the computer system further includes a buffer and an inverter. The buffer is electrically connected to the detecting unit for receiving a state of an output terminal thereof, and transmitting the state to the first BIOS unit. Moreover, the inverter is electrically connected to the buffer and the second BIOS for inverting an output of the buffer and transmitting it to the second BIOS unit.

In an exemplary embodiment of the present invention, the detecting unit can be implemented by a D-type flip-flop, wherein the D-type flip-flop has a clear terminal and a preset terminal, and the preset terminal is fixed to a certain voltage level.

Moreover, the first delay unit is electrically connected to the clear terminal of the D-type flip-flop, and includes a resistor and a capacitor. The resistor electrically connects the clear terminal of the D-type flip-flop to a voltage source. Moreover, the capacitor connects the clear terminal to ground.

The present invention provides an error-detecting method for a BIOS, which is suitable for a computer system. The error-detecting method includes following steps. First, a power-on self test (POST) is executed. Next, a state of a bus signal on a bus is checked after a predetermined delay time. Finally, the BIOS is judged to be abnormal if the state of the bus signal is different from that of the bus signal obtained during normal booting of the computer system.

The present invention further provides a booting method for a computer system, the booting method is as follows. First, the computer system is booted via a first BIOS, and a state of a bus signal is checked after a delay time. Next, the computer system is booted via a second BIOS if the state of the bus signal is different from that of the bus signal obtained during normal booting of the computer system.

In an embodiment of the present invention, the bus signal is a signal that can be transmitted on a serial peripheral interface (SPI), a low pin count (LPC) interface, a front side bus or a peripheral component interconnect interface.

In the present invention, whether the BIOS is normal can be judged according to the state of the bus signal generated by the BIOS. Therefore, errors of the BIOS can be effectively corrected, and the second BIOS is applied for recovery when the error is occurred in the first BIOS.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
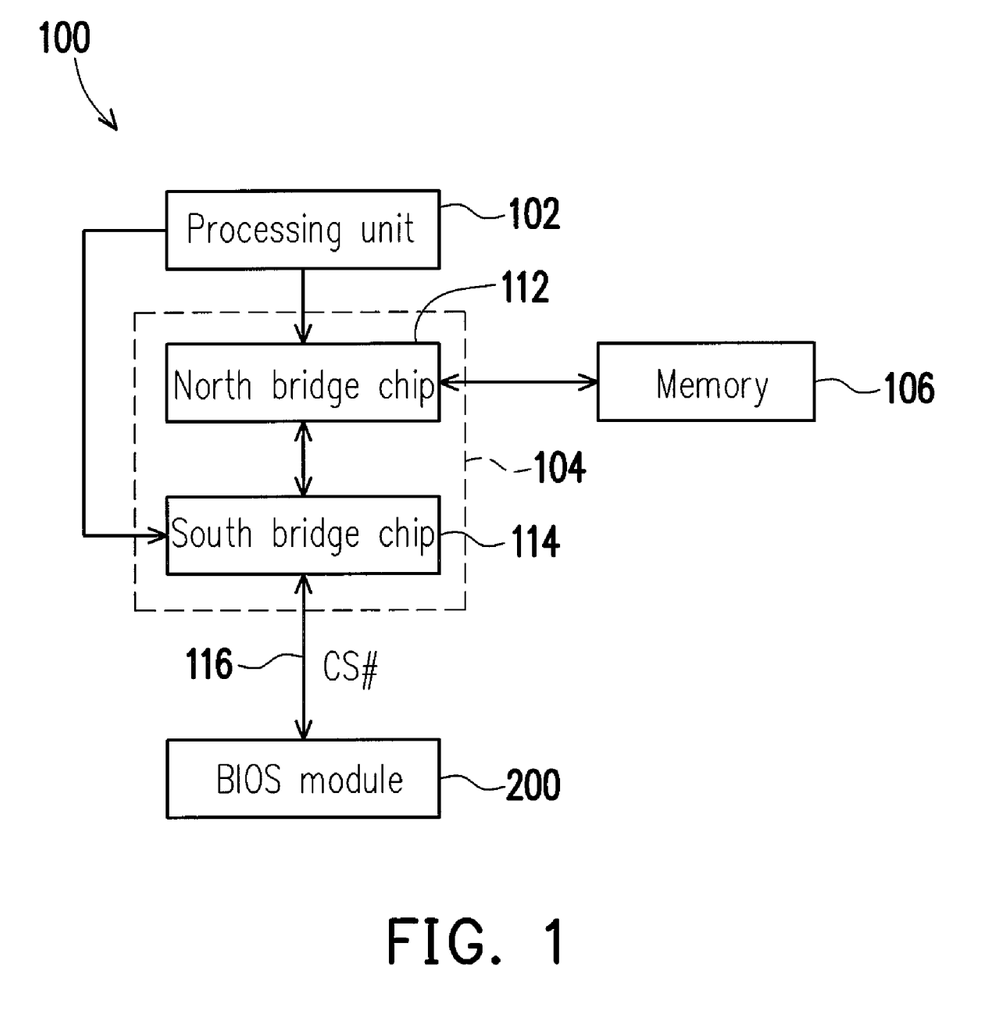
FIG. 1 is a system block diagram illustrating a computer system according to a preferred embodiment of the present invention.

FIG. 1 is a system block diagram illustrating a computer system according to a preferred embodiment of the present invention. Referring to FIG. 1, the computer system 100 includes a processing unit (CPU) 102, a chipset 104, a memory 106 and a BIOS module 200. The CPU 102 is electrically connected to the chipset 104, wherein the chipset 104 includes a north bridge chip 112 and a south bridge chip 114. The CPU 102 can be electrically connected to the north bridge chip 112 via a front side buss (FSB), and the north bridge chip 112 can be connected to the south bridge chip 114 via a peripheral component interconnect (PCI) bus. Moreover, the north bridge chip 112 is also electrically connected to the memory 106. The CPU 102 can also be electrically connected to the south bridge chip 114 via other buses. The south bridge chip 114 can be electrically connected to the BIOS module 200 via an SPI bus or LPC bus.

In the present embodiment, the utilized bus includes an SPI, a LPC interface, a FSB or a peripheral component interconnect interface. In other embodiments, other bus interfaces can also be included.

Figure 2:
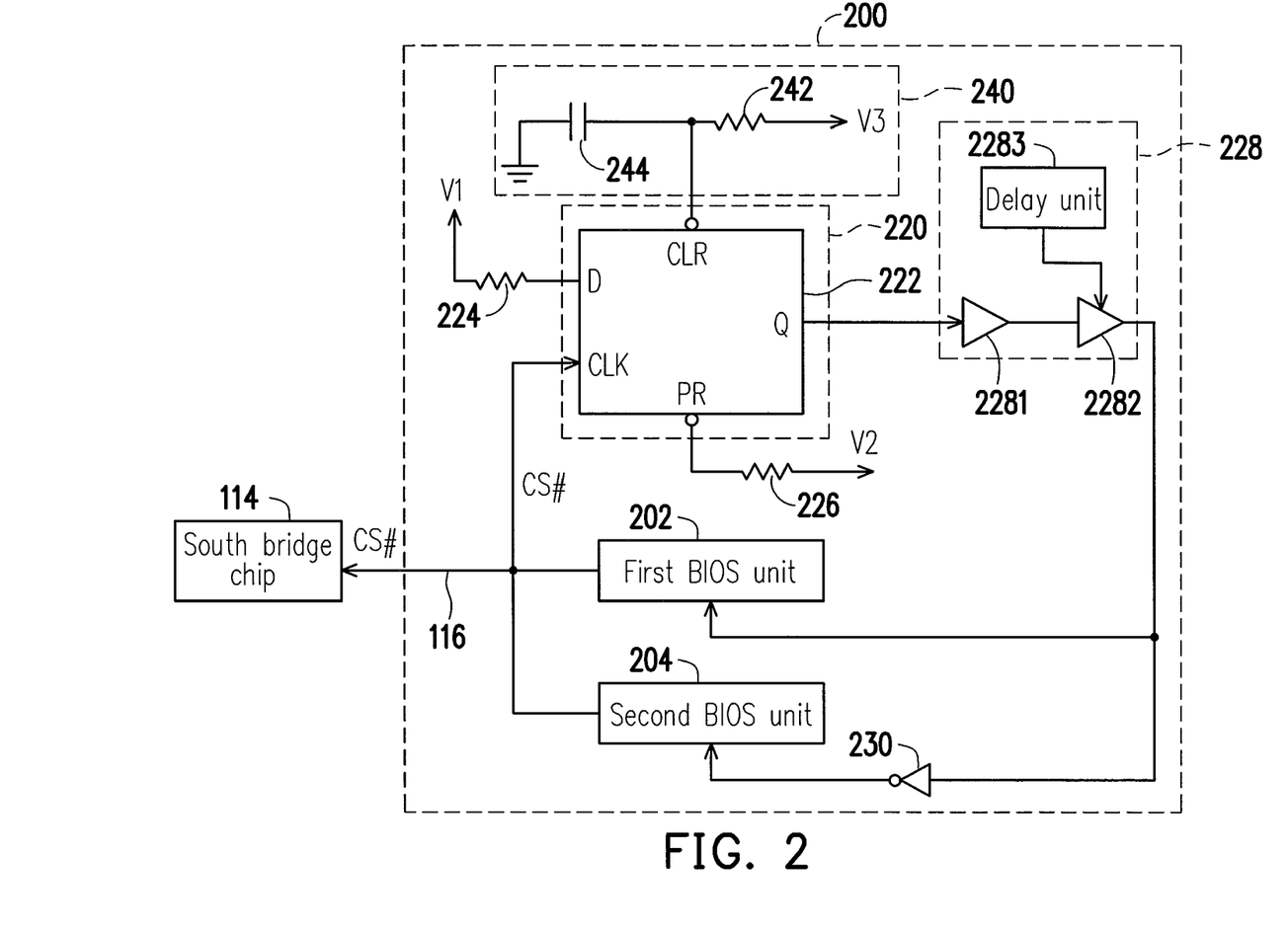
FIG. 2 is a circuit block diagram illustrating a BIOS module according to a preferred embodiment of the present invention.

FIG. 2 is a circuit block diagram illustrating a BIOS module according to a preferred embodiment of the present invention. Referring to FIG. 1 and FIG. 2, the BIOS module 200 of the present embodiment includes a first BIOS unit 202, a second BIOS unit 204, a detecting unit 220 and a delay unit 240. The delay unit 240 is electrically connected to the detecting unit 220 to form a part of a bus signal detecting circuit. In the present embodiment, the detecting unit 220 can be implemented by a D-type flip-flop 222. The D-type flip-flop 222 has an input terminal D, a clock terminal CLK, a clear terminal CLR, a preset terminal PR and an output terminal Q. The clock terminal CLK receives bus signals output from the first BIOS unit 202 and the second BIOS unit 204, and the clear terminal CLR is electrically connected to the delay unit 240. In the present embodiment, the bus signal detected by the clock terminal CLK can be a CS# signal (Hardware signal) in a SPI 116.

It should be noted that in the present embodiment, the bus signal detecting circuit is used for detecting the bus signals between the south bridge chip 114 and the first BIOS unit 202 and the second BIOS unit 204, for example, the CS# signal. In other embodiments, the bus signal detecting circuit can also detect bus signals between other devices, for example, the bus signal between the CPU 102 and the north bridge chip 112, the bus signal between the CPU 102 and the south bridge chip 114, and the bus signal between the north bridge chip 112 and the south bridge chip 114.

For simplicity's sake, in the following content, the CS# signal is regarded as the bus signal detected by the detecting unit 220. Though those skilled in the art should understand that the present invention is not limited thereto.

Referring to FIG. 2 again, the input terminal D of the D-type flip-flop 222 is electrically connected to a voltage V1 (for example, +3.3 volts) via the resistor 224. Moreover, the preset terminal PR is electrically connected to a voltage V2 (which can also be +3.3 volts) via a resistor 226. In the present embodiment, the preset terminal PR of the D-type flip-flop 222 has a logic characteristic of low level enabling, and is fixedly set to a disable state.

In the present embodiment, the BIOS module 200 further includes a buffer 228 and an inverter 230. The buffer 228 further includes buffer units 2281 and 2282, and a delay unit 2283. The buffer unit 2281 is electrically connected to the detecting unit 220, i.e. the buffer unit 2281 can be electrically connected to the output terminal Q of the D-type flip-flop 222. Moreover, the buffer unit 2282 is electrically connected to the buffer unit 2281, the delay unit 2283, the first BIOS unit 202 and the inverter 230, respectively. An output terminal of the inverter 230 is electrically connected to the second BIOS unit 204. By such means, the buffer 228 may transmit a state of the output terminal Q of the D-type flip-flop 222 to the first BIOS unit 202, and the inverter 230 may invert the state of the output terminal Q of the D-type flip-flop 222, and transmit it to the second BIOS unit 204.

In the present embodiment, the delay unit 240 and 2283 can all be implemented by an RC delay circuit. Taking the delay unit 240 as an example, the delay unit 240 at least has a resister 242 and a capacitor 244. The resistor 242 is electrically connected to the clear terminal CLR of the D-type flip-flop 222 and a voltage source V3, respectively. The capacitor 244 is electrically connected to the clear terminal CLR and grounded, respectively. In the present embodiment, a level of the voltage source V3 can be set to +3.3 volts.

To fully convey the spirit of the present invention to those skilled in the art, structure of the BIOS is briefly described first.

Figure 3:
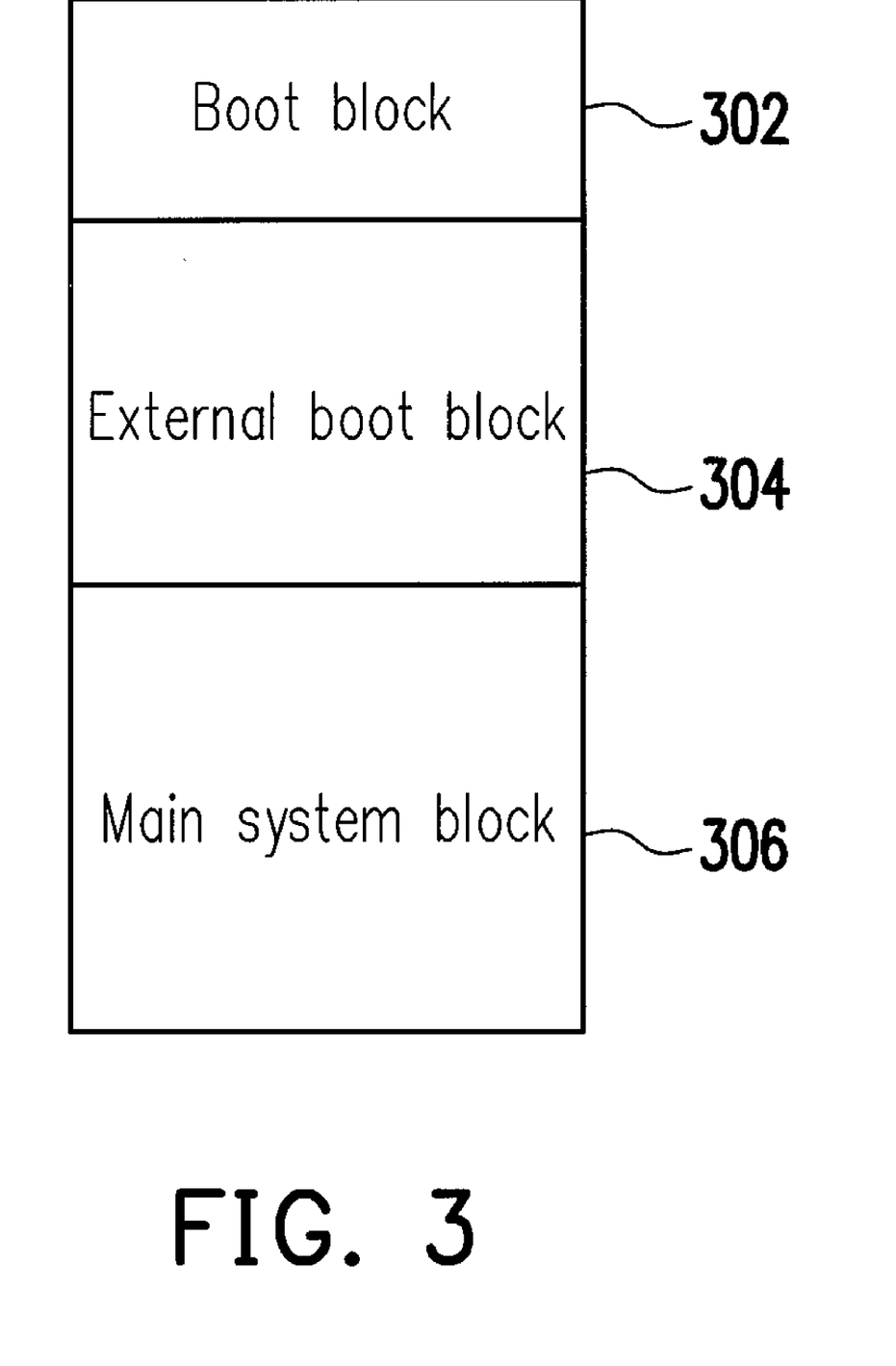
FIG. 3 is a structural diagram of a general BIOS.

FIG. 3 is a structural diagram of a general BIOS. Referring to FIG. 3, presently, BIOS program codes are mostly stored in a non-volatile memory (for example, the first BIOS unit 202 and the second BIOS unit 204 of FIG. 2), which may include a boot block 302, an external boot block 304 and a main system block 306. During the POST process of the BIOS, a plurality of devices is initialized, and initializations thereof are performed by the first BIOS unit 202 or the second BIOS unit 204 via various buses. During such process, the buses transmit various bus signals, and in the present embodiment, a bus signal detecting circuit is used for detecting the bus signals of the SPI between the south chip 114 and the first BIOS unit 202 and the second BIOS unit 204, for example, the bus signal CS# of FIG. 2.

Figure 4A:
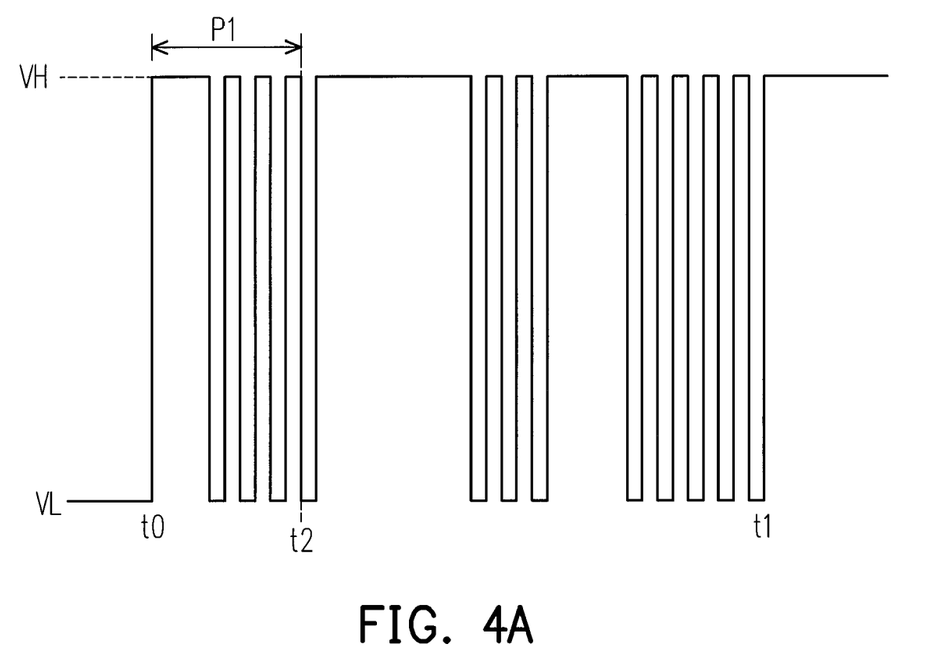
FIGS. 4A-4C are waveform diagrams of bus signals.

During the POST process, if the program codes in the first BIOS unit 202 can be normally executed, the computer system is then normally booted (the POST process). Waveforms of the bus signals related to execution of the BIOS are shown as FIG. 4A. FIG. 4A is a waveform diagram of a signal CS# in a SPI bus during normal booting of a computer system.

In FIG. 4A, when the BIOS program codes are executed (t0), a voltage level of the bus signal CS# is switched from a low voltage VL to a high voltage VH, and is oscillated within a range between the high voltage VH and the low voltage VL. Only until the execution of the BIOS is completed (t1), is the voltage level of the bus signal CS# fixed to the high voltage VH. Certainly, in other embodiments, the waveform of the bus signal can be different due to application of a different bus protocol or a different circuit design.

Figure 4B:
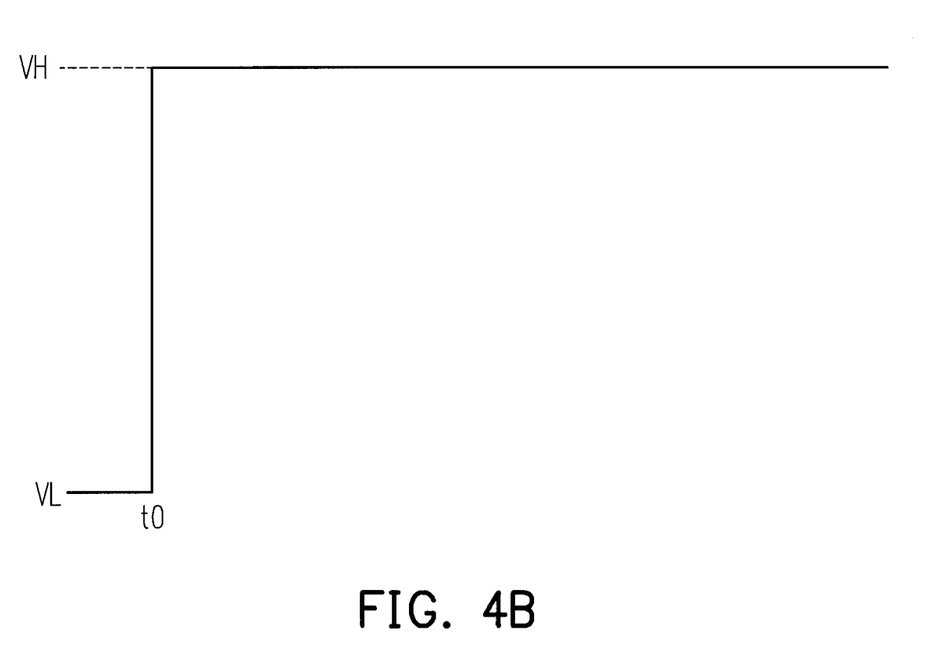

If the program codes in the first BIOS unit 202 (for example, the program code in the boot block 302 and the program code in the main system block 306) are badly damaged, and consequently the computer system cannot be booted, the waveform of the bus signal CS# can be as that shown in FIG. 4B. In FIG. 4B, the bus signal CS# is fixed to the high voltage VH at the beginning of the BIOS execution, and is not oscillated up and down.

Figure 4C:
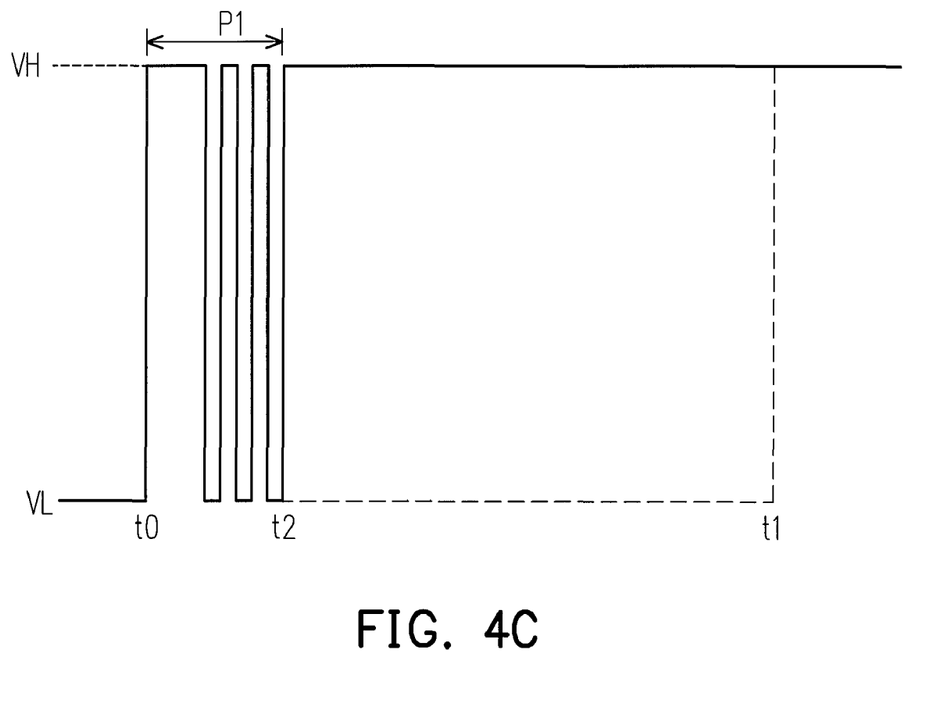

Moreover, if a portion of the program codes in the external boot block 304 or the main system block 306 is damaged, the computer system may be normally booted for a certain extent, for example, the computer system may be no-operational after 5 seconds of booting, and the state of the bus signal CS# can be as that shown in FIG. 4C. In FIG. 4C, the bus signal CS# is also switched from the low voltage VL to the high voltage VH at the beginning of the BIOS execution (t0), and can also be oscillated. However, the voltage level of the bus signal CS# is fixed to the high voltage VH before the execution of the BIOS is completed (t1).

As described above, the waveforms of the bus signal obtained during normal booting of the computer system and abnormal booting of the computer system are different. Based on such a characteristic, in the present embodiment, after the POST is executed by the BIOS, and after the delay unit delays a predetermined delay time, a bus signal of one of the buses in the computer system is detected for judging whether the BIOS is normally operated. Wherein, the bus is a BIOS execution related bus during the booting process.

Referring to FIG. 2 again, when the computer system is booted, the first BIOS unit 202 is activated for executing the POST. Now, the preset terminal PR of the D-type flip-flop 222 is in a disable state, and the clear terminal CLR is still in a low level state after the delay unit 240 provides a RC delay effect. In the present embodiment, since the clear terminal CLR has the characteristic of low level enabling, the output terminal D of the D-type flip-flop 222 has the low level state when the computer system is started to be booted.

After the delay time, the capacitor 244 in the delay unit 240 is charged to a threshold value, so that the clear terminal CLR is also disabled. Now, the state of the output terminal Q of the D-type flip-flop 222 is determined according to the state of the bus signal CS#. Particularly, time required for charging the capacitor 244 to the threshold value is the so-called delay time, which can be designed to be slightly greater than time required for executing the BIOS program codes of the boot block 302. In some embodiment, the delay time of the delay unit 240 can be 200 ms, and the delay time of the delay unit 2283 can be 400 ms. Wherein, the delay time of the delay unit 240 is used for determining a time point that the detecting unit 220 starts to detect the bus signal. The delay time of the delay unit 2283 is used for determining how long the state of the output terminal Q of the D-type flip-flop 222 can be transmitted to the BIOS units 202 and 204.

In the following content, several situations are provided for describing operations of the BIOS module 200 after the delay time during booting of the computer system.

First Situation

Figure 5A:
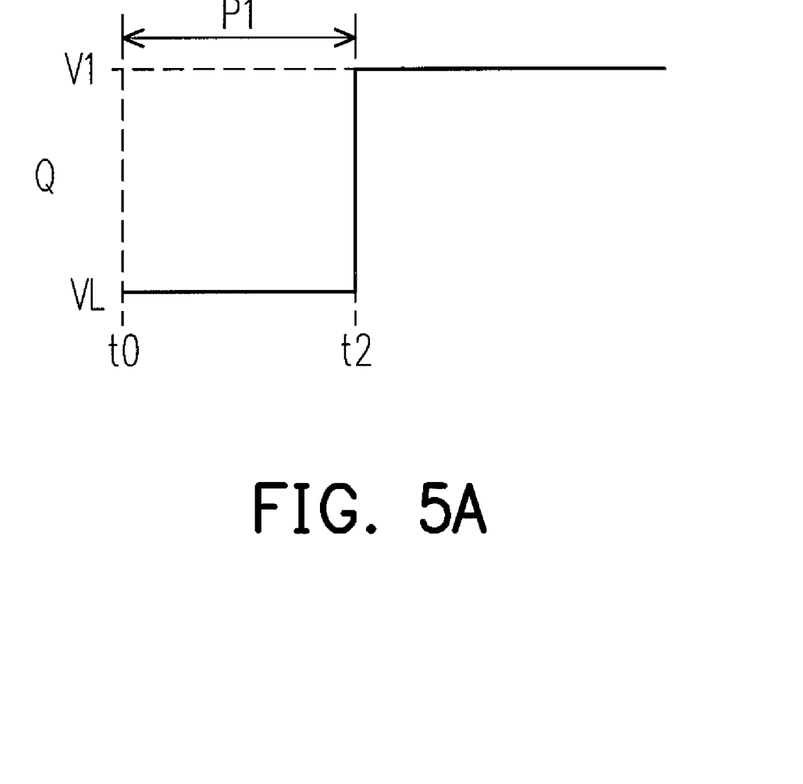
FIG. 5A is a waveform diagram of an output terminal of a D-type flip-flop during a state 1.

FIG. 5A is a waveform diagram of an output terminal of a D-type flip-flop during a state 1. Referring to FIG. 2 and FIG. 5A, when booting of the computer system is started (t0), the state of the output terminal Q of the D-type flip-flop 222 is the low voltage VL (since the clear terminal CLR is enabled). After the delay time P1, at time point t2, the clear terminal CLR is disabled. Now, if a content of the first BIOS unit 202 is totally normal, the state of the bus signal CS# is then as that shown in FIG. 4A, and the D-type flip-flop 222 outputs the state of the input terminal D from the output terminal Q. In other words, the state of the output terminal is changed from the low level to the high level. Now, the first BIOS unit 202 may maintain an operational state. Moreover, the inverter 230 outputs a low level logic signal after inverting the state of the output terminal Q, so that the second BIOS unit 204 is continually disabled.

Second Situation

Figure 5B:
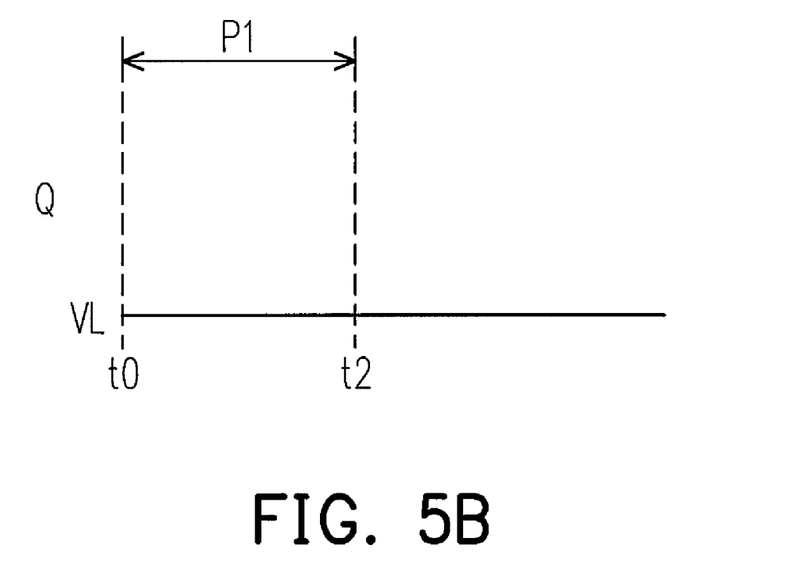
FIG. 5B is a waveform diagram of an output terminal of a D-type flip-flop during a state 2.

FIG. 5B is a waveform diagram illustrating a state 2 of the output terminal of the D-type flip-flop. Referring to FIG. 2 and FIG. 5B, if data of the first BIOS unit 202 is damaged, the state of the bus signal CS# detected by the D-type flip-flop 222 is then as that shown in FIG. 4B or FIG. 4C. Namely, even if the state of the clear terminal CLR is switched from the low level to the high level at the time point t2, since the bus signal CS# received by the clock terminal CLK is not oscillated, the state of the output terminal Q still maintains the low level. Now, the first BIOS unit 202 is disabled. Conversely, the inverter 230 outputs a low level signal to the second BIOS unit 204 after inverting the state of the output terminal Q, so that the second BIOS unit 204 is enabled, and executes a recovery process (which is described in detail below).

Referring back to the first situation, after the delay time, if the bus signal CS# received by the clock terminal CLK is oscillated, it represents at least data in the boot block of the first BIOS unit 202 is not damaged. However, though error data is not existed in the boot block, it may be existed in the external boot block 304 or the main system block 306 of FIG. 3. Therefore, in some embodiments, when the program codes of the external boot block 304 or the main system block 306 are about to be executed, a check sum operation is performed. Namely, the program codes of the external boot block 304 and the main system block 306 are respectively summed to obtain a check sum.

When sum of the program codes of any one of the external boot block 304 and the main system block 306 is not equal to a corresponding predetermined value, the first BIOS, for example, the south bridge chip 114 of FIG. 1 then enables a control signal, so that the state of the output terminal Q of the D-type flip-flop 222 is changed from the high level to the low level. Now, the first BIOS unit 202 is disabled, and the second BIOS unit 204 is enabled, and executes the recovery process.

Correspondingly, if the sum of the program codes of both of the external boot block 304 and the main system block 306 is equal to the corresponding predetermined value, it represents that data of the external boot block 304 and the main system block 306 within the first BIOS unit 202 are not damaged. Therefore, the computer system may apply the first BIOS unit 202 to complete the booting procedure.

Figure 6:
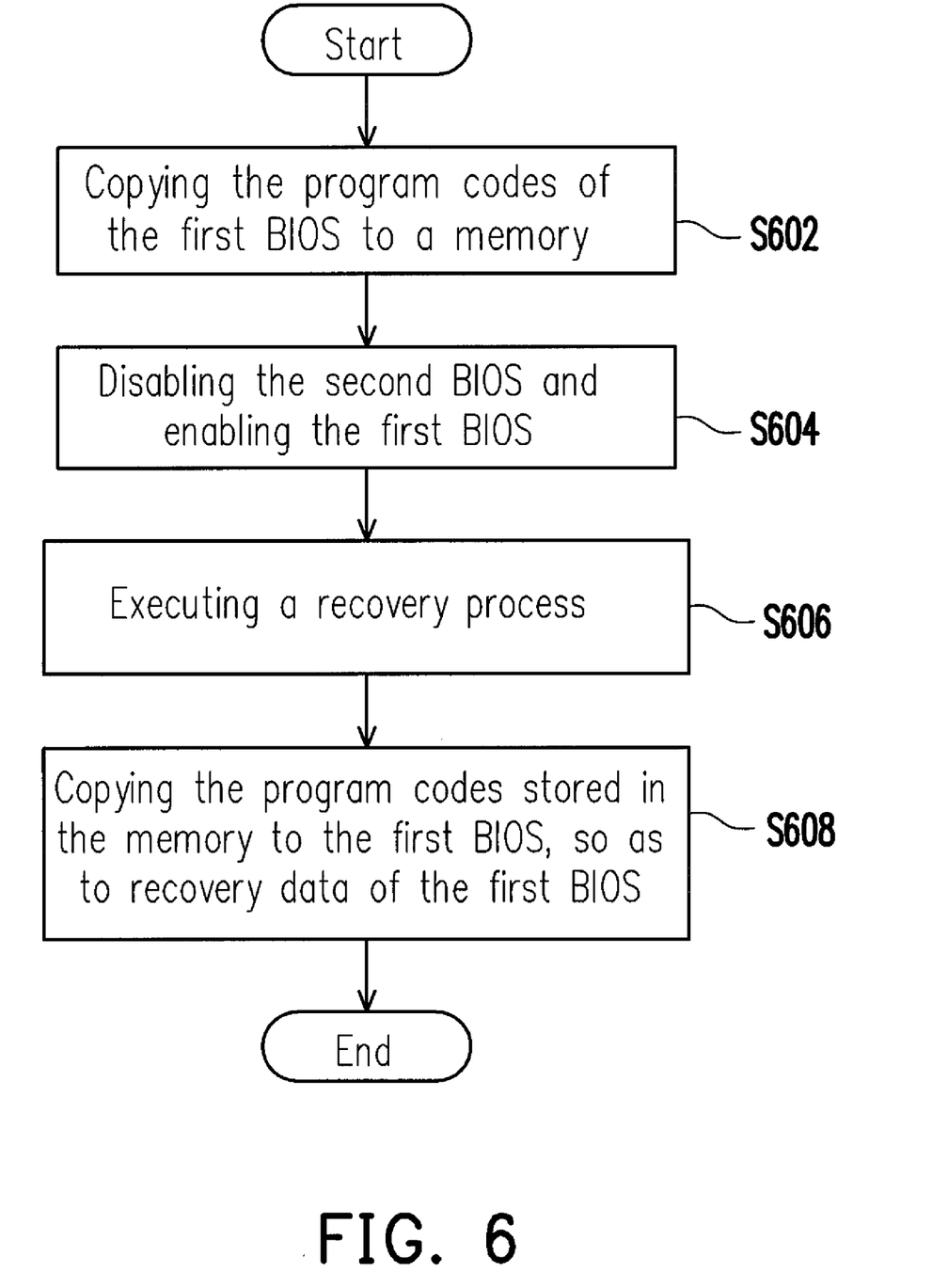
FIG. 6 is a flowchart illustrating a recovery process of a main BIOS according to a preferred embodiment of the present invention.

FIG. 6 is a flowchart illustrating a recovery process of a main BIOS according to a preferred embodiment of the present invention. Referring to FIG. 1, FIG. 2 and FIG. 6, when the second BIOS unit 204 is enabled, and a recovery process is required to be executed, in step S602, the program codes in the second BIOS unit 204 is copied to a memory area in the memory 106 by the chipset 104 through the bus interface 116. Next, in step S604, the second BIOS unit 204 can be disabled, and the first BIOS unit 202 can be enabled.

The program codes copied to the memory area from the second BIOS unit 204 include a recovery program. Therefore, the recovery process of the present embodiment further includes executing the recovery program within the memory area, as that of step S606. Next, in step S608, the program codes stored in the memory area are copied to the first BIOS unit 202 for recovering data of the first BIOS unit 202. When the first BIOS unit 202 completes the data recovery process, the computer system 100 can be rebooted.

Figure 7:
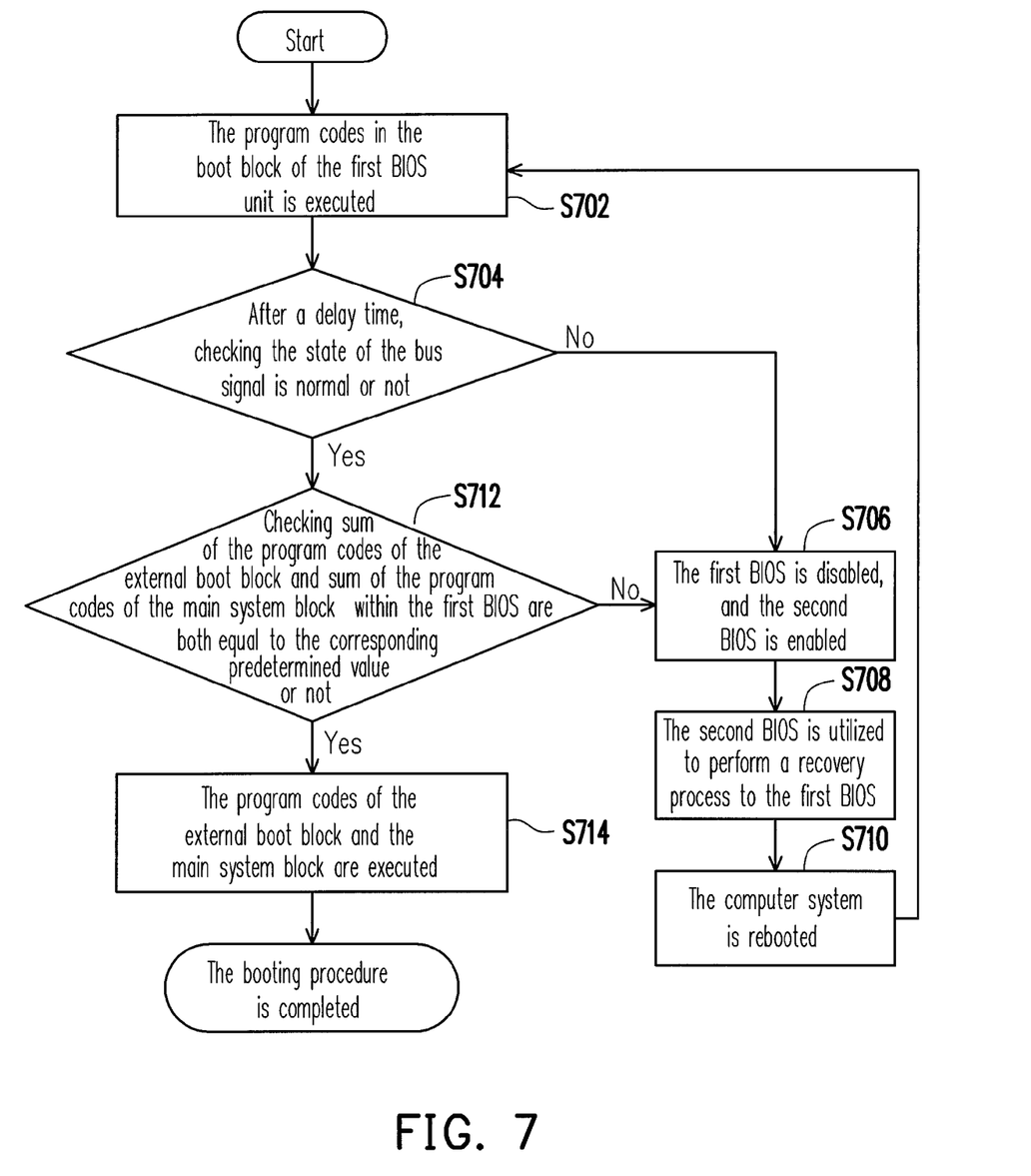
FIG. 7 is a flowchart illustrating a booting method of a computer system according to a preferred embodiment of the present invention.

Further, FIG. 7 is a flowchart illustrating a booting method of a computer system according to a preferred embodiment of the present invention. Referring to FIG. 7, when the computer system is booted, in step S702, the program codes in the boot block of the first BIOS unit is firstly executed for performing the POST, and the bus of the computer system start to transmit the related bus signal. Moreover, in step S704, after a delay time, checking the state of the bus signal (for example, the CS# signal) is normal or not. Wherein, the delay time can be slightly greater than the time required for executing the program codes of the boot block.

After the delay time, if the state of the bus signal is detected to be different to the state of the bus signal obtained during normal booting of the computer system, for example, the state of the bus signal is fixed to a voltage level (as shown in FIG. 4B or FIG. 4C), step S706 is then executed, by which the first BIOS is disabled, and the second BIOS is enabled. Next, in step S708, the second BIOS is utilized to perform a recovery process to the first BIOS, as the process disclosed in FIG. 6. Moreover, after data of the first BIOS is recovered, in step S710, the computer system is rebooted, and the step S702 is repeated.

Correspondingly, in the step S704, if the bus signal is detected to be normal, for example, a voltage level thereof is oscillated within a certain range, it represents the data of the boot block is not damaged. Now, step S712 is executed, by which checking sum of the program codes of the external boot block and sum of the program codes of the main system block within the first BIOS are both equal to the corresponding predetermined value is further checked.

As long as any one of the sum of the program codes of the external boot block and sum of the program codes of the main system block within the first BIOS is not equal to the corresponding predetermined value, it represents the program codes of the external boot block or the main system block has errors. Now, the step S706, etc. can be executed. Conversely, if the sum of the program codes of the external boot block and sum of the program codes of the main system block within the first BIOS are all equal to the corresponding predetermined value, step S714 is executed, by which the program codes of the external boot block and the main system block are executed to complete the booting procedure of the computer system.

In summary, in the present invention, since the start of the bus signal can be checked after a delay time, and a check sum procedure is performed to the external boot block and the main system block, whether the BIOS has any error can be accurately checked. Moreover, since the second BIOS is applied in the present invention, when the first BIOS has errors, it can be quickly recovered via the second BIOS, so that convenience of the recovery process is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system, comprising:
   a first basic input output system (BIOS) unit to boot the computer system;
   a second BIOS unit;
   a bus;
   a detecting unit, operationally connected to the bus, the first BIOS unit and the second BIOS unit for detecting a bus signal on the bus; and
   a first delay unit, electrically connected to the detecting unit, for enabling the detecting unit after a predetermined delay time, so that the detecting unit enables the second BIOS unit to reboot the computer system according to checking a state of the bus signal in an abnormal booting state, wherein the detecting unit further has a clear terminal electrically connected to the first delay unit to receive a clear signal, and a preset terminal disabled.

2. The computer system as claimed in claim 1, wherein the detecting unit has a first terminal coupled to a first voltage, a second terminal operationally connected to the bus for receiving the bus signal and a third terminal operationally connected to the first BIOS unit and the second BIOS unit respectively, so that the detecting unit output a state of the first terminal from the third terminal to the first BIOS unit and the second BIOS unit according to the state of the bus signal.

3. The computer system as claimed in claim 1, wherein the first delay unit comprises:
   a resistor, electrically connected to the clear terminal and a power source respectively; and
   a capacitor, electrically connected to the clear terminal and grounded respectively.

4. The computer system as claimed in claim 1 further comprising:
   a buffer, electrically couple to the detecting unit, the first BIOS unit, and the second BIOS unit, for receiving a state of the third terminal and transmitting the state of the third terminal to the first BIOS unit, wherein the first BIOS unit is coupled to the second BIOS unit; and
   an inverter, electrically connected to the buffer and the second BIOS unit for inverting an output of the buffer, and transmitting it to the second BIOS unit.

5. The computer system as claimed in claim 4, wherein the buffer further comprises a first buffer unit electrically connected to the detecting unit, a second buffer unit electrically connected to the first buffer unit, the first BIOS unit and the inverter respectively and a second delay unit electrically connected to the second buffer unit.

6. The computer system as claimed in claim 1, wherein when a state of the bus signal is different to a state of the bus signal obtained during normal booting, the detecting unit outputs an output signal to the first BIOS unit to disable the first BIOS unit, so that the computer system is booted based on the second BIOS unit.

7. The computer system as claimed in claim 1, wherein the bus is a serial peripheral interface (SPI), a low pin count (LPC) interface, a front side bus or a peripheral component interconnect interface.

\* \* \* \* \*